H. P. M. CARTER.
SECTOR CABLE.
APPLICATION FILED FEB. 28, 1920.
1,393,750.
Patented Oct. 18, 1921.
3 SHEETS—SHEET 2.
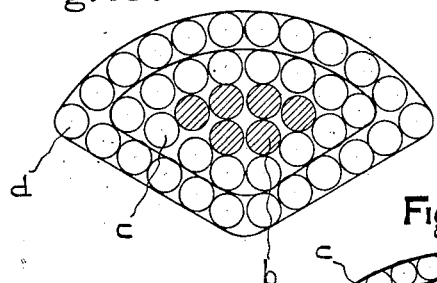
Fig. 13.
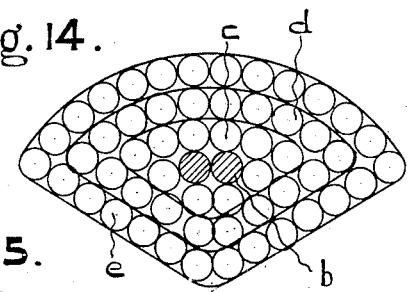
Fig. 14.
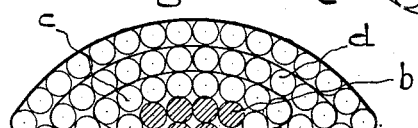
Fig. 15.
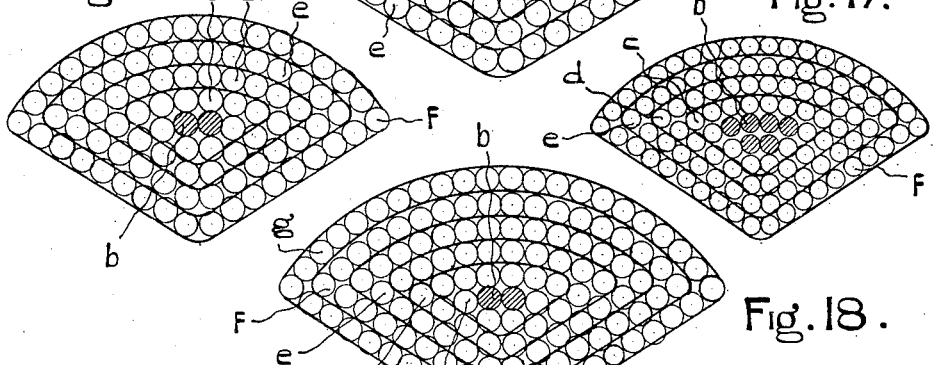
Fig. 16.
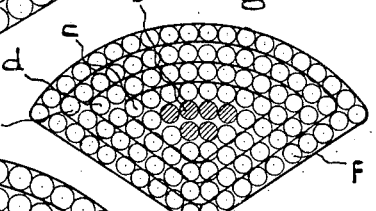
Fig. 17.
Fig. 18.
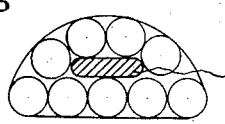
Fig. 19.
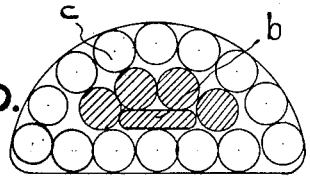
Fig. 20.
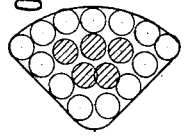
Fig. 23.
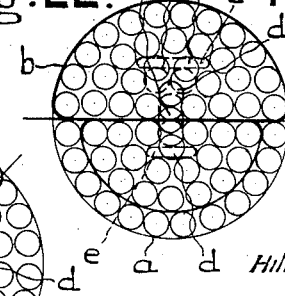
Fig. 22.
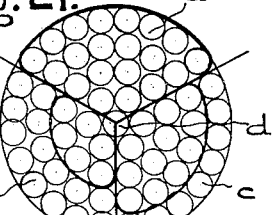
Fig. 21.
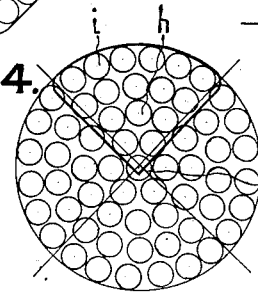
Fig. 24.
Hilton P. M. Carter
Inventor
per Attorney

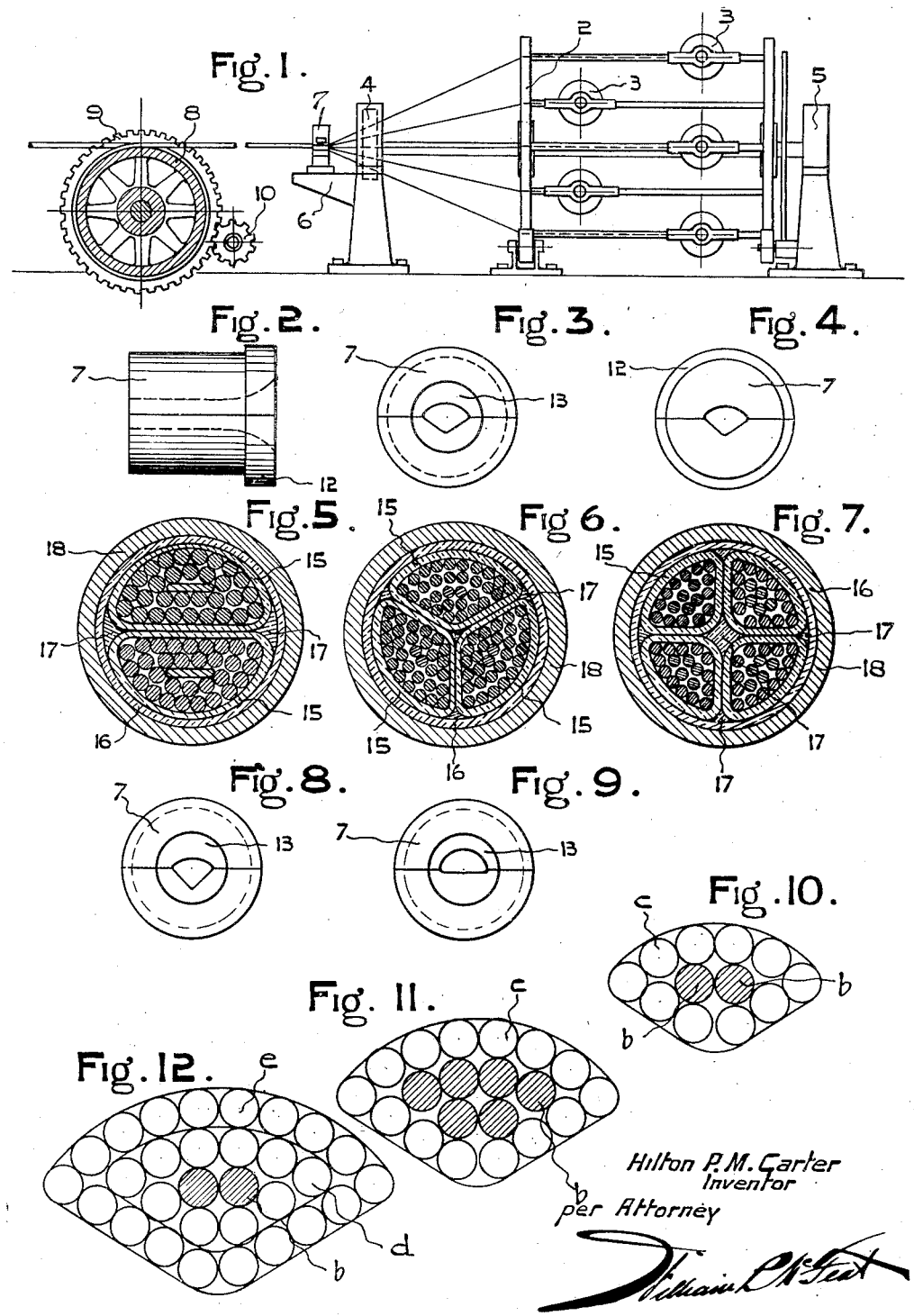

H. P. M. CARTER.
SECTOR CABLE.
APPLICATION FILED FEB. 28, 1920.

1,393,750.

Patented Oct. 18, 1921.
3 SHEETS—SHEET 3.

Hilton P.M.Carter
Inventor.

per Attorney

UNITED STATES PATENT OFFICE.

HILTON P. M. CARTER, OF MONTREAL, QUEBEC, CANADA.

SECTOR-CABLE.

1,393,750. Specification of Letters Patent. Patented Oct. 18, 1921.

Application filed February 28, 1920. Serial No. 362,164.

*To all whom it may concern:*

Be it known that I, HILTON P. M. CARTER, of the city of Montreal, Province of Quebec, Dominion of Canada, a subject of the King of Great Britain, have invented certain new and useful Improvements in Sector-Cables; and I do hereby declare that the following is a full, clear, and exact description thereof.

My invention relates particularly to cables for conducting electricity, although the essential feature thereof may be applied to cables for hauling and other uses.

Heretofore it has been the practice to manufacture cables of the sector type by forming a cable member of circular cross-section and then distorting it by compression to the desired sector form. This practice, I have discovered, has defects which may be overcome by a particular arrangement of the wires to produce the required sector form without the necessity of distortion of the initial form produced or the wires themselves.

My invention consists in passing a plurality of wires of the same size through a sector die, the wires as they pass through the die laying up collectively in sector cross section without distortion of the individual wires. In order to produce this sector strand I employ a machine for laying up or stranding wires comprising one or more alined units. Each unit consists of a rotary drum having a series of wire-carrying spools arranged around its circumference and a sector die mounted in fixed position relatively to the drum, means being located at one end of the machine for pulling the wires from the spools through the die or dies of the units as the drum or drums revolve.

For full comprehension however of my invention reference must be had to the accompanying drawings in which similar reference characters indicate the same parts and wherein:

Figure 1 is a diagrammatic illustration of the essentials of a laying-up or stranding machine equipped with my invention;

Figs. 2, 3 and 4 are side and end elevations respectively of my improved sector-die for forming the sector of a triple conductor cable.

Figs. 5, 6 and 7 are cross-sections of a cable having conductors of sector form and produced according to my invention;

Figs. 8 and 9 are end elevations of the dies for forming the sectors of quadruple and double conductor cable respectively;

Figs. 10, 11, 12, 13, 14, 15, 16, 17 and 18 illustrate diagrammatically conductors laid-up or stranded according to my invention; these several figures illustrate sector-strands constructed to produce a three conductor cable;

Figs. 19 and 20 illustrate diagrammatically sector-strands for double conductor cables constructed according to my invention;

Figs. 21, 22 and 24 respectively illustrate diagrammatically the manner in which the total number of wires for double, triple and quadruple conductor sectors is determined, and Fig. 23 is a diagrammatic view of the lay-up of a sector for a quadruple conductor cable.

Figure 25:
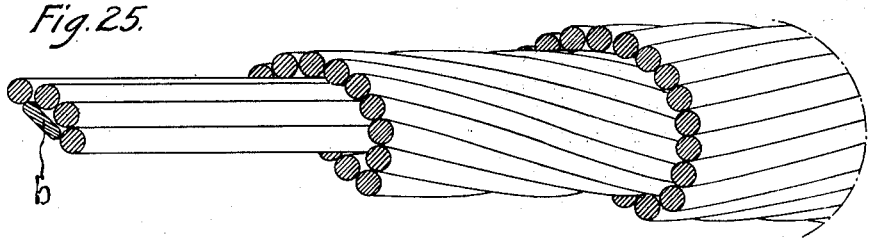
Figure 26:
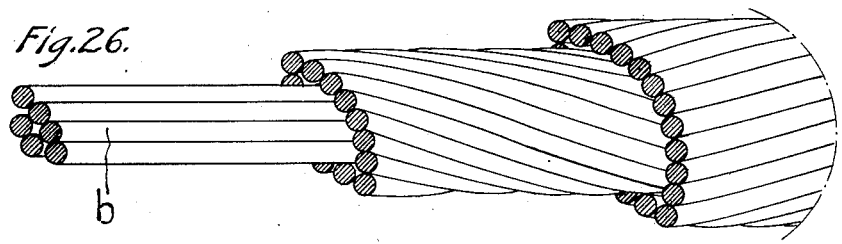
Figure 27:
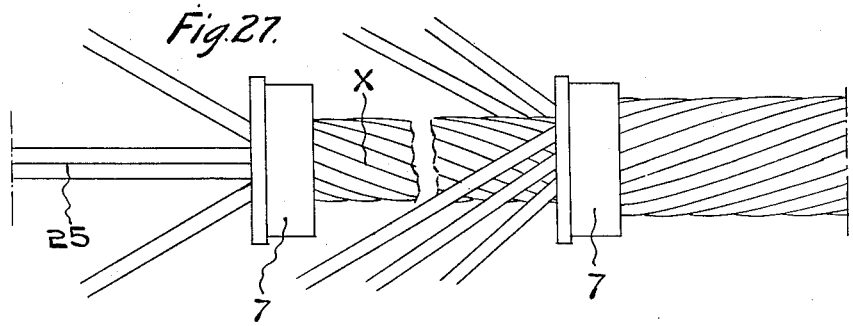
Figure 28:
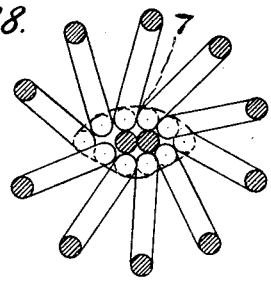

Fig. 25 is a detail perspective view of a sector strand for double conductor cables, the layers of wires being broken away to illustrate the spiral lay up of the same;

Fig. 26 is a similar view to Fig. 25 illustrating a sector strand for triple conductor cables;

Fig. 27 illustrates diagrammatically the method of constructing a sector strand according to my invention; and Fig. 28 is a sectional view illustrating the manner in which the wires enter and lay up in the sector die.

My invention is based upon the fact that round strands following as they do regular laws of sequence in number of wires give little or no trouble at any time and I have carefully constructed a sector strand upon the same principle, starting with a core composed of two or more straight wires having stranded around them in spirals of relatively wide pitch and in arithmetical progression one or more layers of wires each layer increasing in number over the preceding layer by eight-wires. In Fig. 10 is shown a sector-strand having a core of two straight wires $b$ surrounded by ten-wires $c$ stranded with left hand lay.

A triple conductor-cable requiring a twenty wire strand is indicated in Fig. 11 and consists of a core of six straight wires $b$ surrounded by fourteen wires $c$ stranded with left hand lay.

A triple conductor-cable of still larger capacity requiring a thirty-wire strand, for instance, is indicated in Fig. 12 the two straight core wires $b$ have the first series of ten-wires $d$ stranded around them with right hand lay and a second series of eighteen-wires $e$ stranded with left hand lay.

A triple conductor cable of say forty-two wire-strand (Fig. 13) has according to my invention, a core of six straight wires $b$ having a first or inner series of fourteen-wires $c$ stranded around them with right hand lay and a second or outer series $d$ of twenty-two-wires each stranded with left hand lay.

A ninety wire strand as indicated in Fig. 16 has its core of two straight wires $b$ and inner series of stranded wires $c$ the same as in Fig. 12, while the next layer of wires $d$ is stranded with left hand lay and numbers eighteen and another stranded series $e$ of twenty-six with right hand lay and an outer series $f$ of thirty-four-wires with left hand lay. A conductor cable having fifty-six-wire-strands, as indicated in Fig. 14, has its lay-up of wires the same as the ninety-wire strand excepting that the twenty-six-wire series will be the outermost and this series $e$ and the first or inner series $c$ are of left hand lay while the second or intermediate series $d$ has right hand lay. Triple conductor cables of relatively large capacity having, for instance, one hundred and thirty-two-wire strands, have a lay-up the same as cables of fifty-six-wire strands, with two additional series $f$ and $g$ of thirty-four-wires and forty-two-wires stranded with right hand and left hand lays respectively as indicated in Fig. 18.

Triple conductor cables having strands of seventy-two-wires (Fig. 15) and one hundred and ten-wires (Fig. 17) have each a core of six straight wires $b$ and surrounding series stranded alternately in opposite directions, a seventy-two-wire strand having stranded wires in series $c$, $d$ and $e$ of fourteen, twenty-two and thirty wires with left hand, right hand and left hand lay respectively; while the one hundred and ten-wire strand has series $c$, $d$, $e$ and $f$ of fourteen, twenty-two, thirty and thirty-eight wires stranded with right hand, left hand, right hand and left hand lay.

It will be observed from the foregoing that the series or layers increase in arithmetical progression in the number of eight wires for each succeeding layer or series from the core outward; the total number of wires to form any desired sector strand is determined according to my invention by a division of a round strand. For instance to obtain a sector-strand of twenty wires for a triple conductor cable (Fig. 21) I take a standard round strand of the total the nearest multiple of the required sector lay-up (in this case the standard round strand is a 61 wire strand) which when divided into three portions gives three groups of 20 $a$, $b$ and $c$ and an extra wire $d$ which is discarded. Each division of wires is then arranged in layers of sector form as described.

To obtain a sector strand of say 18 wires for a double conductor cable a standard round strand of the nearest multiple of the required number of wires in this case 37 is divided into half portions $a$ and $b$ the extra wire $c$ being discarded and the gap on the flat side of the sector being filled by shifting the wire $d$ of the innermost series and inserting a flat copper strip $e$ in the space formerly occupied by the wire $d$ (see Fig. 22). In a double conductor cable of 30 wires, the gap is filled by shifting the wire $d$ as above mentioned and also wires $f$ and $g$ of the series immediately adjacent the strip $e$ having a greater width than the in the first instance being then inserted.

In evolving a quadruple conductor cables as a standard round cannot be divided into four equal portions without intersecting some of the wires the most preferable division is that indicated in Fig. 24 with the rearrangement indicated in Fig. 23. In this instance the extra wire $d$ is discarded and a wire added to series $h$ and $i$. The number of wires to form a core in each sector-strand being the wires remaining after the series or layers have been determined.

In the case of double conductor cables I employ from, for example, a minimum of a nine-wire series upward as indicated in Figs. 19, 20 and 22 where strands having a range of nine, eighteen, thirty are indicated. With this form of sector-strand the core I employ is either a copper strip $b$ used alone as indicated in Fig. 19 or this copper strip with four straight wires $c$ (Fig. 20) for a strand of eighteen wires. In laying up double conductor cables for a strand of forty-five-wires the copper strip is employed with five straight wires and for a strand of eighty-four-wires the copper strip is employed with six straight wires. These two last instances are not illustrated as the underlying principles are clearly shown in the figures above mentioned. The rule must be strictly observed to maintain the regular arithmetical progression of eight wires in the successive stranded layers which are stranded alternately with right hand and left hand lay.

If desired a quadruple conductor cable may also be produced according to my invention as illustrated in Figs. 7, 23 and 24.

It will also be observed that with my particular arrangement of the wires a concentric nested series of layers each of sector form is produced. As the diameter of the wires evenly divide the arcs in which the wires are located with practically no distortion of the wires they are caused to lie in intimate contact each with the other in each sector layer and with the wires of the surrounding layer and that surrounded thereby as well as the copper strip when serving alone or when supplemented by straight wires.

As hereinbefore stated Fig. 1 illustrates diagrammatically only the essentials of a stranding machine. In stranding a sector cable having a plurality of layers it is usual to employ a battery of drums each being as indicated in Fig. 1 with a sector die for one or more drums, the drums and dies being axially alined and the successive dies progressively increasing in size to accommodate the cable as its size is increased by the addition of each layer. Each drum rotates in a clockwise or counter-clockwise direction in order to cause the wires fed therefrom to wind spirally around the core, the preferred lay up being with one layer wound in one direction and the next in the reverse direction and so on in alternative arrangement. The unit illustrated in Fig. 1 may be considered as that which winds the outermost layer of wires the core or partially finished cable being indicated at X see also Fig. 27 and extending axially through the drum 2 to the die 7. The units which form the partially finished cable correspond in construction to that illustrated and consequently are not shown. The drum 2 is rotatably mounted in a pair of pedestals 4 and 5 and carries a plurality of wire carrying spools 3 mounted thereon in circumferential arrangement the wires from which are drawn through the die 7 by a capstan 8. This capstan is driven by gears 9 and 10 which derive their power from any convenient source.

The die 7 is slidably mounted upon a bracket 6 on pedestal 4. It is constructed in two sections and is of cylindrical form with a circumferential shoulder 12 at its forward end to prevent displacement by the tension exerted upon it while the mouth of the matrix is flared as at 13.

Cross sections of completed cables are indicated in Figs. 5, 6 and 7 and each consists of an insulating layer 15 surrounding each sector fiber inserts 17 an insulating layer 16 inclosing all the sectors and a metal sheathing 18 preferably of lead inclosing the whole.

In the stranding of a sector cable such as illustrated in Fig. 12 a machine consisting of two drums is employed. The core of two straight wires indicated at 25 Fig. 27 is fed axially through the first drum to the first sector die through which it is drawn simultaneously with a surrounding layer of, in this instance, ten wires which are spirally wound about the core by the rotation of the drum from which they are fed, the wires as they are spirally wound maintaining their relative positions collectively presenting sector cross section. It has been found desirable to apply a lubricant to the wires as they pass through the die to minimize friction.

From the first die the core or partially finished strand is drawn axially through the second drum to the second die through which it passes together with a second layer of, in this instance, eighteeen wires which are spirally wound around the core or partially finished strand in a direction opposite to that of the first layer, the whole presenting a strand of sector cross section.

What I claim is as follows:

1. The method of manufacturing a conductor of sector shaped cross-section which consists in passing a plurality of straight wires, of a number and forming a shape having a definite relation to the number of wires in the finished conductor, through a die and stranding in layers other wires of the same size in intimate contact around the first named wires as they all pass through the die, the number of wires in each layer, exceeding that of the preceding layer by eight.

2. A conductor of sector shaped cross-section consisting of a plurality of straight wires, of a number and forming a shape having a definite relation to the number of wires in the finished conductor, and other wires of the same diameter stranded around the first mentioned wires and in intimate contact therewith.

3. A conductor of sector shaped cross-section consisting of a core comprising a plurality of straight wires, of a number and forming a shape having a definite relation to the number of wires in the finished conductor, a plurality of layers of wires of the same diameter as the wires constituting the core and stranded around the same, all the wires being in intimate contact and the number of wires in each layer exceeding that of the preceding layer by eight.

In testimony whereof I have signed my name to this specification in the presence of two witnesses.

HILTON P. M. CARTER.

Witnesses:
GORDON G. COOKE,
WILLIAM J. C. HEWETSON.